US012395560B2

(12) United States Patent
Liu et al.

(10) Patent No.: US 12,395,560 B2
(45) Date of Patent: Aug. 19, 2025

(54) INTERNET OF THINGS RULE ENGINE-BASED TERMINAL CONTROL METHOD AND APPARATUS, AND DEVICE AND MEDIUM

(71) Applicant: E Surfing IoT Co., Ltd, Jiangsu (CN)

(72) Inventors: Jian Liu, Jiangsu (CN); Ming Zhu, Jiangsu (CN); Xia Ding, Jiangsu (CN); Shijie Wang, Jiangsu (CN)

(73) Assignee: E Surfing IoT Co., Ltd, Nanjing (CN)

( * ) Notice: Subject to any disclaimer, the term of this patent is extended or adjusted under 35 U.S.C. 154(b) by 0 days.

(21) Appl. No.: 18/699,655

(22) PCT Filed: Oct. 8, 2022

(86) PCT No.: PCT/CN2022/123843
§ 371 (c)(1),
(2) Date: Apr. 9, 2024

(87) PCT Pub. No.: WO2023/056943
PCT Pub. Date: Apr. 13, 2023

(65) Prior Publication Data
US 2024/0414237 A1    Dec. 12, 2024

(30) Foreign Application Priority Data
Oct. 9, 2021 (CN) .......................... 202111175600.8

(51) Int. Cl.
*H04L 67/125* (2022.01)
*G06F 16/242* (2019.01)
*G06F 16/2455* (2019.01)

(52) U.S. Cl.
CPC ........ *H04L 67/125* (2013.01); *G06F 16/2433* (2019.01); *G06F 16/24552* (2019.01)

(58) Field of Classification Search
CPC .............. H04L 67/125; G06F 16/2433; G06F 16/24552; G06F 9/546; G06F 8/38; Y02P 90/02; G08B 21/182; G16Y 40/30
See application file for complete search history.

(56) References Cited

FOREIGN PATENT DOCUMENTS

| CN | 110971614 A | 4/2020 |
|----|-------------|--------|
| CN | 111698159 A | 9/2020 |

(Continued)

OTHER PUBLICATIONS

International Search Report of PCT Patent Application No. PCT/CN2022/123843 issued on Dec. 19, 2022.

*Primary Examiner* — Benjamin M Thieu

(57) ABSTRACT

Provided are an Internet of Things rule engine-based terminal control method and apparatus, and a device and a medium. The method comprises: parsing, by using a thing model, terminal data reported by a target terminal, so as to obtain parsed data, and storing same in a pulsar message queue, such that pluggable extension plugins and decoupling are realized; performing data enhancement on the parsed data, thereby effectively enhancing the relevance between pieces of data; processing the enhanced data by using a calcite framework and a data processing rule, so as to obtain target data; performing format conversion on the target data by means of an interface of a linkage terminal, which is determined on the basis of a linkage rule; and according to a terminal linkage rule and converted data, controlling the linkage terminal to perform linkage, thereby realizing linkage between terminals according to a rule engine.

20 Claims, 3 Drawing Sheets

(56) References Cited

FOREIGN PATENT DOCUMENTS

| CN | 111784282 A | * | 10/2020 | | |
|----|-------------|---|---------|---|---|
| CN | 113422808 A |   | 9/2021  | | |
| CN | 112333227 B | * | 7/2022  | ............. | G16Y 30/00 |

* cited by examiner

INTERNET OF THINGS RULE ENGINE-BASED TERMINAL CONTROL METHOD AND APPARATUS, AND DEVICE AND MEDIUM

TECHNICAL FIELD

The present application relates to the technical field of Internet of Things, and more particularly, to an Internet of Things rule engine-based terminal control method, apparatus, and a device, and a medium.

BACKGROUND ART

In Internet of Things (IoT), since there is a large amount of data, the business rules of each terminal may vary from one to another, and therefore, the setting of the rules needs to be simple and friendly to accommodate the diversity and variation of the business rules.

In addition, each terminal in the Internet of Things usually works independently and cannot be associated with each other, in some abnormal scenarios (e.g., if the water consumption of residents exceeds the standard), it may cause personnel injury and economic loss due to the failure of linkage between terminals.

SUMMARY OF THE INVENTION

In view of the above, it is necessary to provide an Internet of Things rule engine-based terminal control method, apparatus, and device, and a medium in order to solve the problem of controlling the terminal in the Internet of Things.

An Internet of Things rule engine-based terminal control method, including:
  acquiring data reported by a target terminal to an Internet of Things platform as terminal data when it is detected that the target terminal accesses an Internet of Things platform;
  parsing, by using a pre-established thing model, the terminal data, so as to obtain parsed data, and storing the parsed data in a pulsar message queue;
  consuming the parsed data in the pulsar message queue, and performing data enhancement on the parsed data, so as to obtain enhanced data;
  reading, according to the terminal data, from a Redis cache a data processing rule and a terminal linkage rule corresponding to the target terminal;
  processing the enhanced data by using a calcite framework and a data processing rule, so as to obtain target data, and storing the target data in the pulsar message queue;
  consuming the target data in the pulsar message queue, determining a linkage terminal on the basis of the linkage rule, and determining an interface of the linkage terminal;
  performing format conversion on the target data by means of an interface of the linkage terminal, so as to obtain converted data; and
  according to the terminal linkage rule and the converted data, controlling the linkage terminal to perform linkage.

According to a preferred embodiment of the present application, the method further includes:
  performing real-time stream processing on the basis of a flink framework when executing the Internet of Things rule engine-based terminal control method.

According to a preferred embodiment of the present application, the parsing, by using a pre-established thing model, the terminal data, so as to obtain parsed data, and storing the parsed data in a pulsar message queue includes:
  querying, using the terminal data, in the thing model, so as to obtain attribute fields;
  combining the attribute fields, so as to obtain the parsed data;
  acquiring a pre-established source data storage queue in the pulsar message queue; and
  writing the parsed data to the source data storage queue.

According to a preferred embodiment of the present application, the performing data enhancement on the parsed data, so as to obtain enhanced data includes:
  acquiring a device shadow;
  combining the device shadow with the parsed data, so as to obtain the enhanced data; and
  incrementally updating the enhanced data into the device shadow.

According to a preferred embodiment of the present application, before reading, according to the terminal data, from a Redis cache a data processing rule and a terminal linkage rule corresponding to the target terminal, the method further includes:
  constructing a visual editing interface on the basis of a D3 framework;
  collecting input data when it is detected that there is data input in the visual editing interface;
  acquiring a terminal identifier of each terminal and a rule corresponding to each terminal from the collected data;
  configuring a rule ID for each rule corresponding to each terminal respectively;
  generating rule data of each terminal according to a terminal identifier of each terminal, a rule corresponding to each terminal and a configuration ID of each rule; and
  storing the rule data in the Redis cache.

According to a preferred embodiment of the present application, the processing the enhanced data by using a calcite framework and a data processing rule, so as to obtain target data, and storing the target data in the pulsar message queue includes:
  acquiring a statement identifier from the terminal data, and using the statement identifier to query a SQL statement in the terminal data;
  checking legitimacy of the SQL statement using the calcite framework;
  acquiring, using the SQL statement, table field information in the data processing rule when the legitimacy of the SQL statement passes the check;
  creating a memory table according to the table field information;
  writing the enhanced data into the memory table;
  querying, using the SQL statement, configuration fields and condition data in the memory table;
  filtering, according to the configuration field, the enhanced data, so as to obtain filtered data;
  cleaning, according to the condition data, the screened data, so as to obtain the target data;
  acquiring a pre-established target data storage queue in the pulsar message queue; and
  writing the target data to the target data storage queue.

According to a preferred embodiment of the present application, when according to the terminal linkage rule and the converted data, controlling the linkage terminal to perform linkage, the method further includes:

reading, according to the terminal data, an alarm rule corresponding to the target terminal from the Redis cache when it is detected that alarm information is generated;

acquiring an alarm target and an alarm method recorded in the alarm rule;

sending the alarm information to the alarm target on the basis of the alarm method;

reading, according to the terminal data, a message flow rule corresponding to the target terminal from the Redis cache;

acquiring a cloud storage address or a northbound application address recorded in the message flow rule; and uploading the target data to the cloud storage address or the northbound application address.

An Internet of Things rule engine-based terminal control apparatus including:

an acquisition unit configured to acquire data reported by a target terminal to an Internet of Things platform as terminal data when it is detected that the target terminal accesses an Internet of Things platform;

a parsing unit configured to parse, by using a pre-established thing model, the terminal data, so as to obtain parsed data, and store the parsed data in a pulsar message queue;

an enhancement unit configured to consume the parsed data in the pulsar message queue, and perform data enhancement on the parsed data, so as to obtain enhanced data;

a reading unit configured to read, according to the terminal data, from a Redis cache a data processing rule and a terminal linkage rule corresponding to the target terminal;

a processing unit configured to process, using a calcite framework and the data processing rule, the enhanced data, so as to obtain target data, and store the target data in the pulsar message queue;

a determination unit configured to consume the target data in the pulsar message queue, determine a linkage terminal on the basis of the linkage rule, and determine an interface of the linkage terminal;

a conversion unit configured to perform format conversion on the target data by means of an interface of the linkage terminal, so as to obtain converted data; and a control unit configured to, according to the terminal linkage rule and the converted data, control the linkage terminal to perform linkage.

A computer device including a memory for storing at least one instruction; and a processor configured to execute instructions stored in the memory to implement the Internet of Things rule engine-based terminal control method.

A computer-readable storage medium, where the computer-readable storage medium has stored therein at least one instruction which is executed by a processor in a computer device to implement the Internet of Things rule engine-based terminal control method.

It can be seen from the above-mentioned technical solutions that the present application can, when it is detected that a target terminal accesses an Internet of Things platform, acquire data reported by the target terminal to the Internet of Things platform as terminal data, use a pre-established thing model to parse the terminal data, so as to obtain parsed data, and store the parsed data in a pulsar message queue, achieve pluggable extension plug-ins and decoupling via a pulsar message middleware, consume the parsed data in the pulsar message queue, and perform data enhancement on the parsed data, so as to obtain enhanced data; the extension of data is realized, the data volume is increased, the relevance between data can be enhanced effectively, the attributes of data are made more comprehensive, and then the accuracy of data processing is improved; according to the terminal data, a data processing rule and a terminal linkage rule corresponding to the target terminal are read from a Redis cache; a calcite framework and the data processing rule are used to process the enhanced data, so as to obtain target data; the ability of rule calculation is realized through the calcite framework, and the target data is stored in the pulsar message queue; the target data is consumed in the pulsar message queue, a linkage terminal is determined on the basis of the linkage rule, and an interface of the linkage terminal is determined, the target data is performed format conversion on the basis of the interface of the linkage terminal, so as to obtain converted data, the target data is packaged and converted into a corresponding format to facilitate targeted calling, and the linkage terminal is controlled to perform linkage according to the terminal linkage rule and the converted data, and then linkage between terminals is realized according to a rule engine to better control the combined operation of terminals.

DETAILED DESCRIPTION OF THE INVENTION

In order that the objectives, aspects, and advantages of the present application will become apparent, a more particular description of the present application will be rendered by reference to specific embodiments thereof which are illustrated in the appended drawings.

Figure 1:
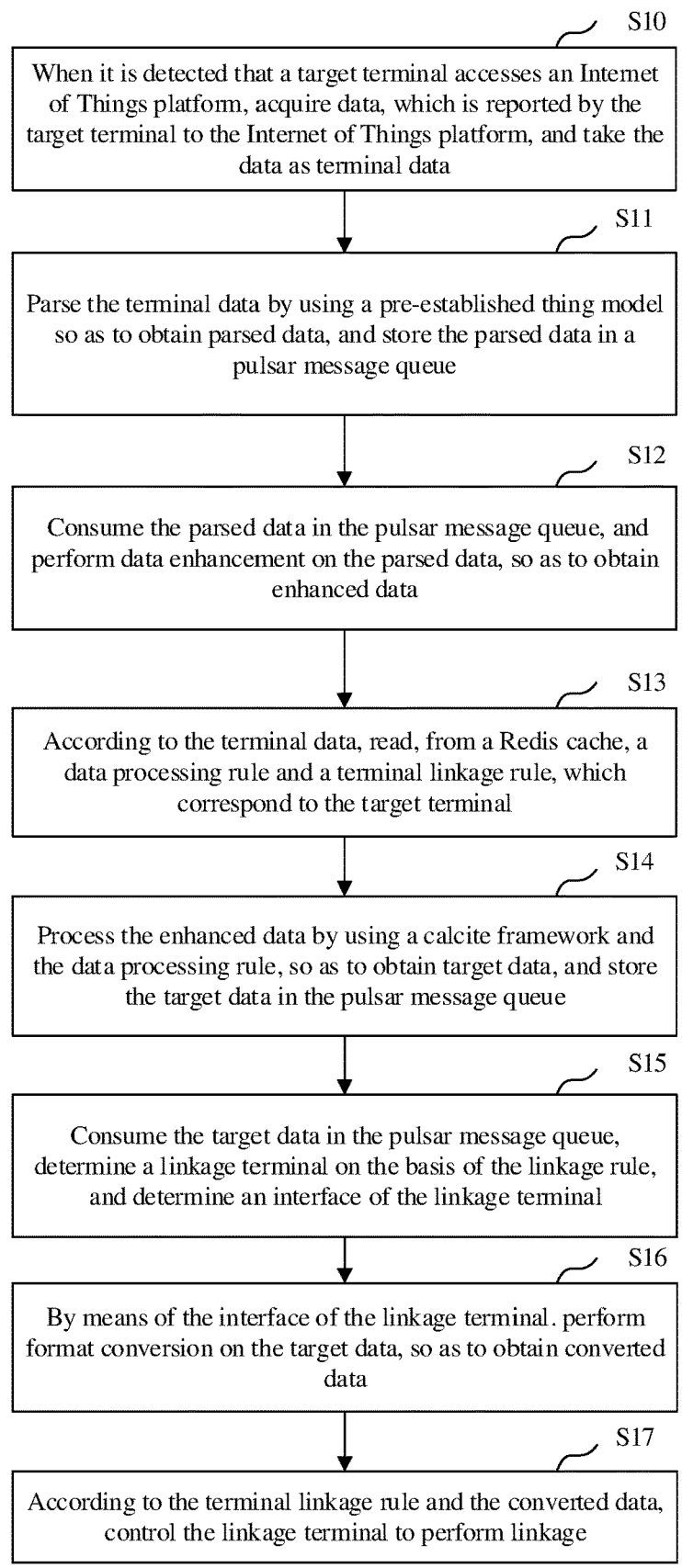
FIG. 1 is a flowchart of a preferred embodiment of an Internet of Things rule engine-based terminal control according to the present application.

As shown in FIG. 1, it is a flowchart of a preferred embodiment of an Internet of Things rule engine-based terminal control according to the present application. The order of the steps in the flowchart may be varied and certain steps may be omitted according to different requirements.

The Internet of Things rule engine-based terminal control method is applied to one or more computer devices, where the computer device is a device capable of automatically performing numerical calculation and/or information processing according to pre-set or stored instructions, and the hardware thereof includes but is not limited to a microprocessor, an Application Specific Integrated Circuit (ASIC), a Field-Programmable Gate Array (FPGA), a Digital Signal Processor (DSP), an embedded device, etc.

The computer device may be any electronic product that can interact with a user, such as a personal computer, tablet, smartphone, Personal Digital Assistant (PDA), a game player, an Interactive Internet Protocol Television (IPTV), a smart wearable device, etc.

The computer device may further include a network device and/or a user device. Where the network device includes, but is not limited to, a single network server, a server group composed of multiple network servers, or a cloud composed of a large number of hosts or network servers on the basis of cloud computing.

The server can be an independent server, and can also be a cloud server providing basic cloud computing services, such as a cloud service, a cloud database, cloud computing, a cloud function, cloud storage, a network service, cloud communication, a middleware service, a domain name service, a security service, a Content Delivery Network (CDN), and a large data and artificial intelligence platform.

Artificial Intelligence (AI) is a theory, method, technology and application system that uses a digital computer or digital computer-controlled machine to simulate, extend and expand human intelligence, perceive the environment, acquire knowledge and use the knowledge, so as to obtain the best results.

The basic technologies of artificial intelligence generally include such technologies as sensor, special artificial intelligence chip, cloud computing, distributed storage, large data processing technology, operation/interaction system, electromechanical integration, etc. Artificial intelligence software technology mainly includes computer vision technology, robot technology, biological recognition technology, speech processing technology, natural language processing technology and machine learning/in-depth learning.

The network in which the computer device is located includes, but is not limited to, the Internet, a wide area network, a metropolitan area network, a local area network, a Virtual Private Network (VPN), etc.

S10 Acquire data reported by a target terminal to an Internet of Things platform as terminal data when it is detected that the target terminal accesses an Internet of Things platform.

In at least one embodiment of the present application, the target terminal may include any terminal device requesting to access the Internet of Things, e.g., water consumption detection equipment, intelligent water heater, etc.

In at least one embodiment of the present application, the terminal data may include, but is not limited to, one or a combination of the following:

a terminal name of the target terminal, a terminal identifier of the target terminal, and an owner of the target terminal.

In the present embodiment, the terminal data may include a device level, a product level, and a device grouping level.

With the device level and the device grouping level, a product can be defined depending on a thing model, and linkage can be performed on a subsequent specified device or a device grouping.

It should be noted that the present application performs real-time stream processing on the basis of the flink framework when executing the Internet of Things rule engine-based terminal control method.

S11 Parse, by using a pre-established thing model, the terminal data, so as to obtain parsed data, and store the parsed data in a pulsar message queue.

In at least one embodiment of the present application, the thing model corresponds to a dictionary in which mappings between data are stored.

Specifically, parsing, by using a pre-established thing model, the terminal data, so as to obtain parsed data, and storing the parsed data in a pulsar message queue includes:

querying is performed using the terminal data in the thing model, so as to obtain attribute fields;
the attribute fields are combined, so as to obtain the parsed data;
a pre-established source data storage queue in the pulsar message queue is acquired; and
the parsed data is written to the source data storage queue.

The subject of the source data storage queue may be/ad.

It should be noted that compared with other types of message middleware, pulsar message queue has stronger security, stricter characteristics, higher concurrent processing, higher support and higher performance.

In the embodiments described above, pluggable extension plug-ins and decoupling are achieved through the pulsar message middleware.

S12 Consume the parsed data in the pulsar message queue, and perform data enhancement on the parsed data, so as to obtain enhanced data.

In at least one embodiment of the present application, the performing data enhancement on the parsed data, so as to obtain enhanced data includes:

a device shadow is acquired;
the device shadow is combined with the parsed data, so as to obtain the enhanced data; and
the enhanced data is incrementally updated into the device shadow.

Specifically, the device shadow refers to reported data information.

Through data enhancement, the device shadow can be used to effectively enhance the relevance between data, make the data attributes more comprehensive, and then improve the accuracy of data processing.

S13 Read, according to the terminal data, from a Redis cache a data processing rule and a terminal linkage rule corresponding to the target terminal.

In the present embodiment, various rules are stored in the Redis cache.

Specifically, before reading, according to the terminal data, from a Redis cache a data processing rule and a terminal linkage rule corresponding to the target terminal, the method further includes: a visual editing interface is constructed on the basis of a D3 framework;

input data is collected when it is detected that there is data input in the visual editing interface;
a terminal identifier of each terminal and a rule corresponding to each terminal are acquired from the collected data;
a rule ID for is configured for each rule corresponding to each terminal respectively;
rule data of each terminal is generated according to a terminal identifier of each terminal, a rule corresponding to each terminal and a configuration ID of each rule; and
the rule data is stored in the Redis cache.

The visual editing interface may be a web interface, which is not limited by the present application.

The rules corresponding to each terminal may include, but are not limited to one or a combination of more of the following rules:

a data processing rule, a terminal linkage rule, an alarm rule and a message flow rule.

Through the above-mentioned embodiments, the ability of visual editing rules is realized by combining the D3 framework and the thing model, and the user's use experience is improved.

Further, the reading, according to the terminal data, from a Redis cache a data processing rule and a terminal linkage rule corresponding to the target terminal includes:

a terminal identifier of the target terminal is acquired from the terminal data;

rule data of the target terminal is read from the Redis cache according to a terminal identifier of the target terminal;

a first rule ID corresponding to a data processing rule is acquired, and a second rule ID corresponding to a terminal linkage rule is acquired;

matching is performed in the rule data of the target terminal using the first rule ID and the second rule ID; and the matched rule is determined as a data processing rule and a terminal linkage rule corresponding to the target terminal.

S14 Process, using a calcite framework and the data processing rule, the enhanced data, so as to obtain target data, and store the target data in the pulsar message queue.

In the present embodiment, the calcite framework is a dynamic data management framework.

Specifically, the processing the enhanced data by using a calcite framework and a data processing rule, so as to obtain target data, and storing the target data in the pulsar message queue includes:

statement identifier is acquired from the terminal data, and the statement identifier is used to query a structured query language (SQL) statement in the terminal data;

legitimacy of the SQL statement is checked using the calcite framework;

table field information in the data processing rule is acquired using the SQL statement when the legitimacy of the SQL statement passes the check;

a memory table is created according to the table field information;

the enhanced data is written into the memory table;

configuration fields and condition data are queried using the SQL statement in the memory table;

the enhanced data is filtered according to the configuration field, so as to obtain filtered data;

the screened data is cleaned according to the condition data, so as to obtain the target data;

a pre-established target data storage queue in the pulsar message queue is acquired; and the target data is written to the target data storage queue.

The statement identifier can be a product Id, a device Id, etc.

The target data storage queue may be/rule_engine_data_output.

In the present embodiment, the legitimacy of the SQL statement is checked using the calcite framework includes:

the syntax of the SQL statement is checked;

it is determined that the legitimacy of the SQL statement passes a check when the syntax of the SQL statement is correct;

or it is determined that the legitimacy of the SQL statement fails a check when the syntax of the SQL statement is erroneous.

In the present embodiment, no operation is performed when it is determined that the legitimacy of the SQL statement fails the check.

Through the above-mentioned embodiments, the screening and cleaning of data reported by the target terminal can be realized on the basis of the calcite framework to improve the availability of data, and at the same time, indirectly improving the storage utilization rate of data.

S15 Consume the target data in the pulsar message queue, determine a linkage terminal on the basis of the linkage rule, and determine an interface of the linkage terminal.

In the present embodiment, the linkage rule stores respective linkage terminals that need to perform linkage, and an interface corresponding to each linkage terminal.

S16 Perform format conversion on the target data on the basis of the interface of the linkage terminal, so as to obtain converted data.

Specifically, the performing format conversion on the target data on the basis of the interface of the linkage terminal, so as to obtain converted data includes:

a data format of an interface of each linkage terminal is acquired; and the target data is converted into a format corresponding to the data format of the interface of each linkage terminal, so as to obtain the converted data.

Through format conversion of the target data, the converted data can be identified and processed by a corresponding interface.

S17 According to the terminal linkage rule and the converted data, control the linkage terminal to perform linkage.

For example: a property management company monitors whether the amount of water used by an owner of a house is normal; when it is detected that the amount of data reported by a water meter exceeds a threshold value and no one is at home, since the water meter data detects whether there is someone at home and the water gate is a terminal device which is not connected with each other, whether the amount of water used reaches the threshold value and whether there is someone at home according to a rule defined in a rule engine, and then a linkage of closing the water gate and alarm notification to the owner is realized by adding an alarm rule and a terminal linkage rule.

The present embodiment can support the linkage of a plurality of terminal devices across a product through the terminal linkage rule, and can also realize the linkage of a part of terminal devices under a certain product by performing group identification on the terminal devices.

With the above-mentioned embodiments, an automatic linkage between terminal devices can be realized through a rule engine, and an association relationship between a plurality of terminal devices can be realized through a cross-product and cross-device linkage, without needing to concentrate on one terminal device to realize all the functions, and the probability of personnel injury and economic loss can be reduced in some abnormal scenarios.

In at least one embodiment of the present application, when, according to the terminal linkage rule and the converted data, controlling the linkage terminal to perform linkage, the method further includes:

an alarm rule corresponding to the target terminal is read from the Redis cache according to the terminal data when it is detected that alarm information is generated;

an alarm target and an alarm method recorded in the alarm rule are acquired;

the alarm information is sent to the alarm target on the basis of the alarm method;

a message flow rule corresponding to the target terminal is read from the Redis cache according to the terminal data;

a cloud storage address or a northbound application address recorded in the message flow rule is acquired; and the target data is uploaded to the cloud storage address or the northbound application address.

The alarm information can be generated by an abnormal terminal device, for example, the alarm information can be used for prompting that the water consumption is out of limits, etc.

The alarm target includes a user to whom an alarm needs to be issued.

The alarm method may include, but is not limited to, one or a combination of more of the following modes: short messages, mails, station letters, etc.

In the above-mentioned embodiments, timely alarm of an exception can be realized through the alarm rule to improve the processing efficiency of an exception and avoid causing a significant loss.

At the same time, by pushing data to cloud storage and/or applications, the occupancy rate of storage space is reduced.

Further, the method further includes:
when there is a newly added storage mode, a message flow rule corresponding to the newly added storage mode is added.

Of course, it is also possible to configure data processing rules and the like corresponding to the new storage mode at the same time, and configure corresponding plug-ins at the same time, which is not limited by the present application.

It can be seen from the above-mentioned technical solutions that the present application can, when it is detected that a target terminal accesses an Internet of Things platform, acquire data reported by the target terminal to the Internet of Things platform as terminal data, use a pre-established thing model to parse the terminal data, so as to obtain parsed data, and store the parsed data in a pulsar message queue, achieve pluggable extension plug-ins and decoupling via a pulsar message middleware, consume the parsed data in the pulsar message queue, and perform data enhancement on the parsed data, so as to obtain enhanced data; the extension of data is realized, the data volume is increased, the relevance between data can be enhanced effectively, the attributes of data are made more comprehensive, and then the accuracy of data processing is improved; according to the terminal data, a data processing rule and a terminal linkage rule corresponding to the target terminal are read from a Redis cache; a calcite framework and the data processing rule are used to process the enhanced data, so as to obtain target data; the ability of rule calculation is realized through the calcite framework, and the target data is stored in the pulsar message queue; the target data is consumed in the pulsar message queue, a linkage terminal is determined on the basis of the linkage rule, and an interface of the linkage terminal is determined, the target data is performed format conversion on the basis of the interface of the linkage terminal, so as to obtain converted data, the target data is packaged and converted into a corresponding format to facilitate targeted calling, and the linkage terminal is controlled to perform linkage according to the terminal linkage rule and the converted data, and then linkage between terminals is realized according to a rule engine to better control the combined operation of terminals.

Figure 2:
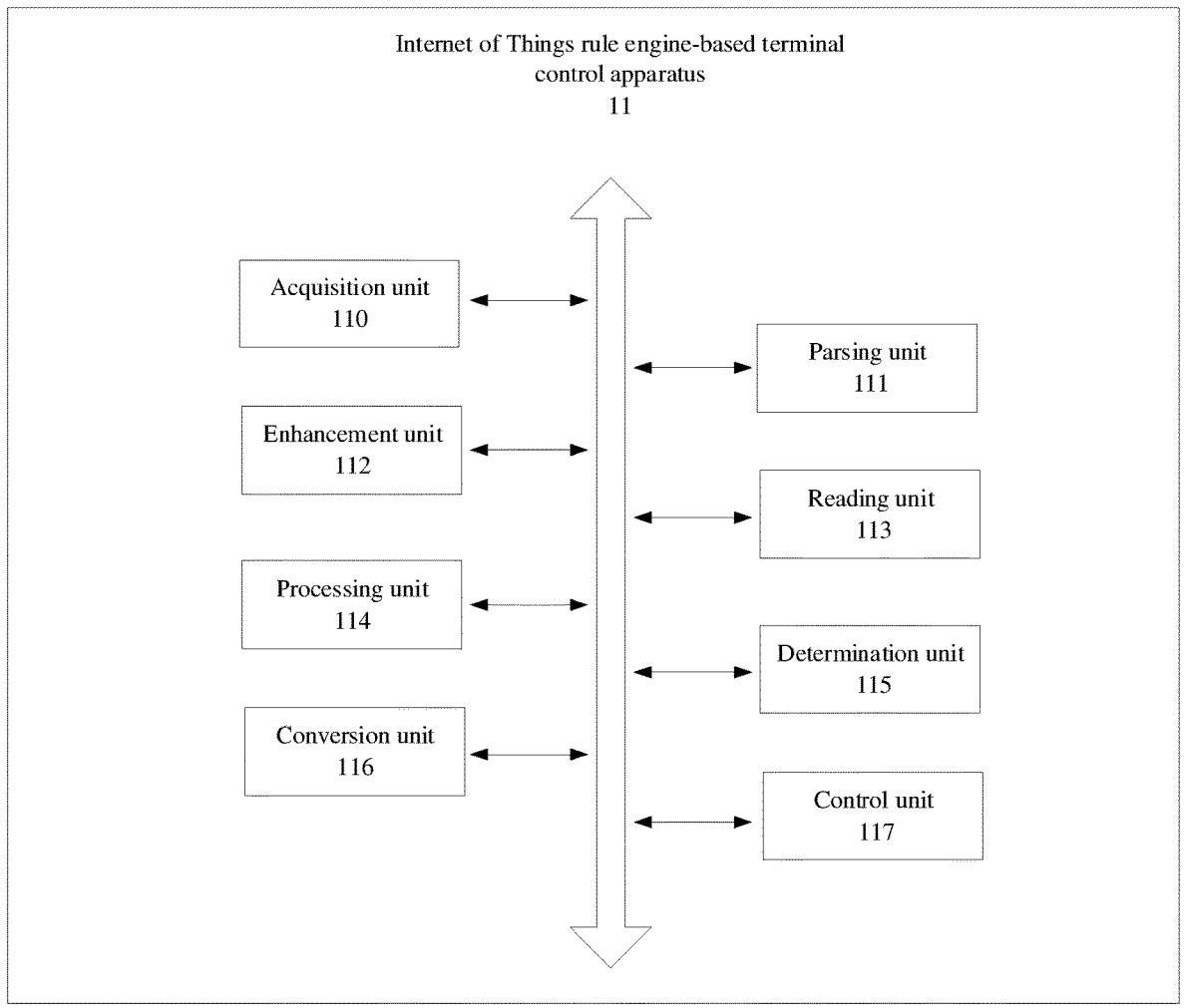
FIG. 2 is a functional block diagram of a preferred embodiment of the Internet of Things rule engine-based terminal control apparatus according to the present application.

As shown in FIG. 2, it is a functional block diagram of a preferred embodiment of the Internet of Things rule engine-based terminal control apparatus according to the present application. The Internet of Things rule engine-based terminal control apparatus 11 includes an acquisition unit 110, a parsing unit 111, an enhancement unit 112, a reading unit 113, a processing unit 114, a determination unit 115, a conversion unit 116 and a control unit 117. A module/unit as referred to in the present application refers to a series of computer program segments executable by the processor 13 and capable of performing fixed functions and stored in the memory 12. In the present embodiment, the functions of the respective modules/units will be described in detail in the following embodiments.

An acquisition unit 110 is configured to acquire data reported by a target terminal to an Internet of Things platform as terminal data when it is detected that the target terminal accesses an Internet of Things platform.

In at least one embodiment of the present application, the target terminal may include any terminal device requesting to access the Internet of Things, e.g., water consumption detection equipment, intelligent water heater, etc.

In at least one embodiment of the present application, the terminal data may include, but is not limited to, one or a combination of the following:
a terminal name of the target terminal, a terminal identifier of the target terminal, and an owner of the target terminal.

In the present embodiment, the terminal data may include a device level, a product level, and a device grouping level.

With the device level and the device grouping level, a product can be defined depending on a thing model, and linkage can be performed on a subsequent specified device or a device grouping.

It should be noted that the present application performs real-time stream processing on the basis of the flink framework when executing the Internet of Things rule engine-based terminal control method.

The parsing unit 111 parses the terminal data by using a pre-established thing model, so as to obtain parsed data, and storing the parsed data in a pulsar message queue.

In at least one embodiment of the present application, the thing model corresponds to a dictionary in which mappings between data are stored.

Specifically, the parsing unit 111 parses the terminal data by using a pre-established thing model, so as to obtain parsed data, and storing the parsed data in a pulsar message queue includes:
querying is performed using the terminal data in the thing model, so as to obtain attribute fields;
the attribute fields are combined, so as to obtain the parsed data;
a pre-established source data storage queue in the pulsar message queue is acquired; and
the parsed data is written to the source data storage queue.

The subject of the source data storage queue may be/ad.

It should be noted that compared with other types of message middleware, pulsar message queue has stronger security, stricter characteristics, higher concurrent processing, higher support and higher performance.

In the embodiments described above, pluggable extension plug-ins and decoupling are achieved through the pulsar message middleware.

An enhancement unit 112 is configured to consume the parsed data in the pulsar message queue, and perform data enhancement on the parsed data, so as to obtain enhanced data.

In at least one embodiment of the present application, the performing data enhancement, by the enhancement unit 112, on the parsed data, so as to obtain enhanced data includes:
a device shadow is acquired;
the device shadow is combined with the parsed data, so as to obtain the enhanced data; and
the enhanced data is incrementally updated into the device shadow.

Specifically, the device shadow refers to reported data information.

Through data enhancement, the device shadow can be used to effectively enhance the relevance between data, make the data attributes more comprehensive, and then improve the accuracy of data processing.

A reading unit 113 is configured to read, according to the terminal data, from a Redis cache a data processing rule and a terminal linkage rule corresponding to the target terminal.

In the present embodiment, various rules are stored in the Redis cache.

Specifically, before reading, according to the terminal data, from a Redis cache a data processing rule and a terminal linkage rule corresponding to the target terminal, a visual editing interface is constructed on the basis of a D3 framework;
  input data is collected when it is detected that there is data input in the visual editing interface;
  a terminal identifier of each terminal and a rule corresponding to each terminal are acquired from the collected data;
  a rule ID for is configured for each rule corresponding to each terminal respectively;
  rule data of each terminal is generated according to a terminal identifier of each terminal, a rule corresponding to each terminal and a configuration ID of each rule; and
  the rule data is stored in the Redis cache.

The visual editing interface may be a web interface, which is not limited by the present application.

The rules corresponding to each terminal may include, but are not limited to one or a combination of more of the following rules:
  a data processing rule, a terminal linkage rule, an alarm rule and a message flow rule.

Through the above-mentioned embodiments, the ability of visual editing rules is realized by combining the D3 framework and the thing model, and the user's use experience is improved.

Further, the reading, according to the terminal data, by a reading unit 113 from a Redis cache a data processing rule and a terminal linkage rule corresponding to the target terminal includes: a terminal identifier of the target terminal is acquired from the terminal data;
  rule data of the target terminal is read from the Redis cache according to a terminal identifier of the target terminal;
  a first rule ID corresponding to a data processing rule is acquired, and a second rule ID corresponding to a terminal linkage rule is acquired;
  matching is performed in the rule data of the target terminal using the first rule ID and the second rule ID; and
  the matched rule is determined as a data processing rule and a terminal linkage rule corresponding to the target terminal.

The processing unit 114 is configured to process, using a calcite framework and the data processing rule, the enhanced data, so as to obtain target data, and store the target data in the pulsar message queue.

In the present embodiment, the calcite framework is a dynamic data management framework.

Specifically, the processing, using a calcite framework and the data processing rule, the enhanced data by the processing unit 114, so as to obtain target data, and storing the target data in the pulsar message queue includes:

statement identifier is acquired from the terminal data, and the statement identifier is used to query a Structured Query Language (SQL) statement in the terminal data;
legitimacy of the SQL statement is checked using the calcite framework;
table field information in the data processing rule is acquired using the SQL statement when the legitimacy of the SQL statement passes the check;
a memory table is created according to the table field information;
the enhanced data is written into the memory table;
configuration fields and condition data are queried using the SQL statement in the memory table;
the enhanced data is filtered according to the configuration field, so as to obtain filtered data;
the screened data is cleaned according to the condition data, so as to obtain the target data;
a pre-established target data storage queue in the pulsar message queue is acquired; and
the target data is written to the target data storage queue.

The statement identifier can be a product Id, a device Id, etc.

The target data storage queue may be/rule_engine_data_output.

In the present embodiment, the legitimacy of the SQL statement is checked using the calcite framework includes:
  the syntax of the SQL statement is checked;
  it is determined that the legitimacy of the SQL statement passes a check when the syntax of the SQL statement is correct;
  or it is determined that the legitimacy of the SQL statement fails a check when the syntax of the SQL statement is erroneous.

In the present embodiment, no operation is performed when it is determined that the legitimacy of the SQL statement fails the check.

Through the above-mentioned embodiments, the screening and cleaning of data reported by the target terminal can be realized on the basis of the calcite framework to improve the availability of data, and at the same time, indirectly improving the storage utilization rate of data.

A determination unit 115 is configured to consume the target data in the pulsar message queue, determine a linkage terminal on the basis of the linkage rule, and determine an interface of the linkage terminal.

In the present embodiment, the linkage rule stores respective linkage terminals that need to perform linkage, and an interface corresponding to each linkage terminal.

A conversion unit 116 is configured to perform format conversion on the target data by means of an interface of the linkage terminal, so as to obtain converted data.

Specifically, the performing format conversion on the target data by the conversion unit 116 on the basis of the interface of the linkage terminal, so as to obtain converted data includes:
  a data format of an interface of each linkage terminal is acquired; and
  the target data is converted into a format corresponding to the data format of the interface of each linkage terminal, so as to obtain the converted data.

Through format conversion of the target data, the converted data can be identified and processed by a corresponding interface.

A control unit 117 is configured to, according to the terminal linkage rule and the converted data, control the linkage terminal to perform linkage.

For example: a property management company monitors whether the amount of water used by an owner of a house is normal; when it is detected that the amount of data reported by a water meter exceeds a threshold value and no one is at home, since the water meter data detects whether there is someone at home and the water gate is a terminal device which is not connected with each other, whether the amount of water used reaches the threshold value and whether there is someone at home according to a rule defined in a rule engine, and then a linkage of closing the water gate and alarm notification to the owner is realized by adding an alarm rule and a terminal linkage rule.

The present embodiment can support the linkage of a plurality of terminal devices across a product through the terminal linkage rule, and can also realize the linkage of a part of terminal devices under a certain product by performing group identification on the terminal devices.

With the above-mentioned embodiments, an automatic linkage between terminal devices can be realized through a rule engine, and an association relationship between a plurality of terminal devices can be realized through a cross-product and cross-device linkage, without needing to concentrate on one terminal device to realize all the functions, and the probability of personnel injury and economic loss can be reduced in some abnormal scenarios.

In at least one embodiment of the present application, when the linkage terminal is controlled to perform linkage according to the terminal linkage rule and the converted data, when it is detected that alarm information is generated, an alarm rule corresponding to the target terminal is read from the Redis cache according to the terminal data;

an alarm target and an alarm method recorded in the alarm rule are acquired;

the alarm information is sent to the alarm target on the basis of the alarm method;

a message flow rule corresponding to the target terminal is reading from the Redis cache according to the terminal data;

a cloud storage address or a northbound application address recorded in the message flow rule is acquired; and the target data is uploaded to the cloud storage address or the northbound application address.

The alarm information can be generated by an abnormal terminal device, for example, the alarm information can be used for prompting that the water consumption is out of limits, etc.

The alarm target includes a user to whom an alarm needs to be issued.

The alarm method may include, but is not limited to, one or a combination of more of the following modes: short messages, mails, station letters, etc.

In the above-mentioned embodiments, timely alarm of an exception can be realized through the alarm rule to improve the processing efficiency of an exception and avoid causing a significant loss.

At the same time, by pushing data to cloud storage and/or applications, the occupancy rate of storage space is reduced.

Further, when there is a newly added storage mode, a message flow rule corresponding to the newly added storage mode is added.

Of course, it is also possible to configure data processing rules and the like corresponding to the new storage mode at the same time, and configure corresponding plug-ins at the same time, which is not limited by the present application.

It can be seen from the above-mentioned technical solutions that the present application can, when it is detected that a target terminal accesses an Internet of Things platform, acquire data reported by the target terminal to the Internet of Things platform as terminal data, use a pre-established thing model to parse the terminal data, so as to obtain parsed data, and store the parsed data in a pulsar message queue, achieve pluggable extension plug-ins and decoupling via a pulsar message middleware, consume the parsed data in the pulsar message queue, and perform data enhancement on the parsed data, so as to obtain enhanced data; the extension of data is realized, the data volume is increased, the relevance between data can be enhanced effectively, the attributes of data are made more comprehensive, and then the accuracy of data processing is improved; according to the terminal data, a data processing rule and a terminal linkage rule corresponding to the target terminal are read from a Redis cache; a calcite framework and the data processing rule are used to process the enhanced data, so as to obtain target data; the ability of rule calculation is realized through the calcite framework, and the target data is stored in the pulsar message queue; the target data is consumed in the pulsar message queue, a linkage terminal is determined on the basis of the linkage rule, and an interface of the linkage terminal is determined, the target data is performed format conversion on the basis of the interface of the linkage terminal, so as to obtain converted data, the target data is packaged and converted into a corresponding format to facilitate targeted calling, and the linkage terminal is controlled to perform linkage according to the terminal linkage rule and the converted data, and then linkage between terminals is realized according to a rule engine to better control the combined operation of terminals.

Figure 3:
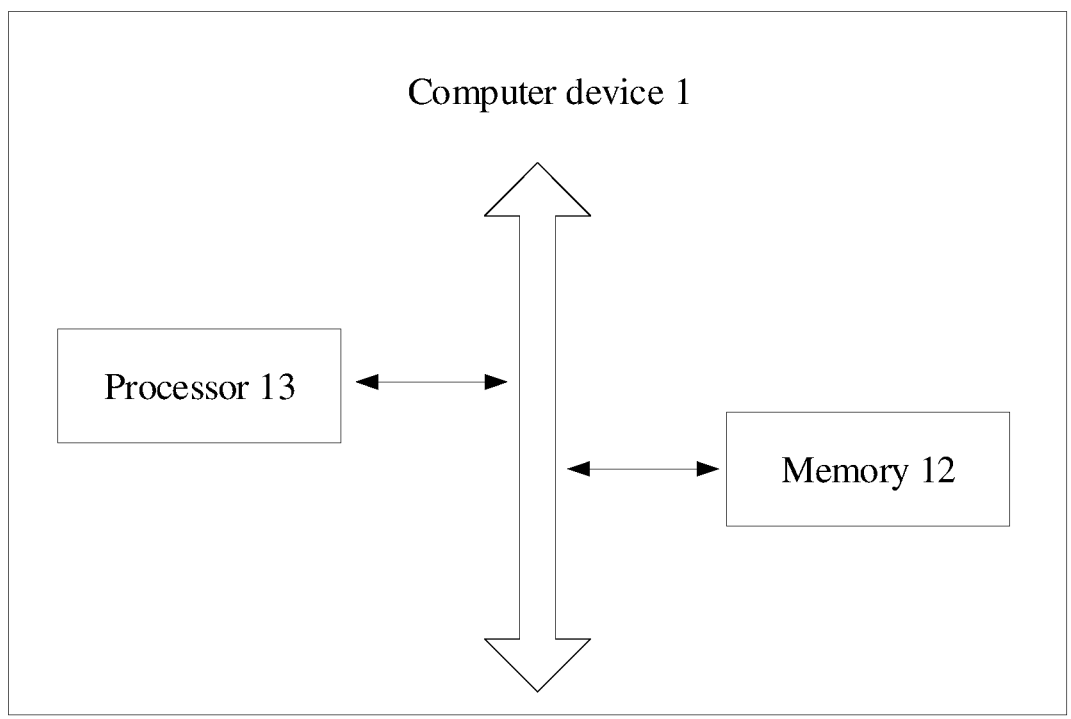
FIG. 3 is a schematic structural diagram of a computer device implementing a preferred embodiment of the Internet of Things rule engine-based terminal control method according to the present application.

As shown in FIG. 3, it is a schematic structural diagram of a computer device implementing a preferred embodiment of the Internet of Things rule engine-based terminal control method according to the present application.

The computer device 1 may include a memory 12, a processor 13 and a bus, and may further include a computer program stored in the memory 12 and executable on the processor 13, for example, an Internet of Things rule engine-based terminal control program.

It will be appreciated by a person skilled in the art that the diagram is merely an example of a computer device 1 and does not constitute a limitation of the computer device 1, that the computer device 1 may be either a bus-type structure or a star-type structure, that the computer device 1 may further include more or less other hardware or software than shown, or a different arrangement of components, e.g. the computer device 1 may further include input and output devices, network access devices, etc.

It should be noted that the computer device 1 described is only an example, and that other existing or future electronic products, such as may be adapted to the present application, are also included within the scope of the present application and are incorporated herein by reference.

The memory 12 includes at least one type of readable storage medium, where the readable storage medium includes a flash memory, a mobile hard disk, a multimedia card and a card-type memory (for example: SD or DX memory, etc.), magnetic memory, magnetic disk, optical disk, etc. The memory 12 may in some embodiments be an internal storage unit of the computer device 1, such as a mobile hard disk of the computer device 1. The memory 12 may in other embodiments also be an external storage device of the computer device 1, such as a plug-in mobile hard disk, a Smart Media Card (SMC), a Secure Digital (SD) card, a Flash Card, etc. provided on the computer device 1. Further, the memory 12 may include both an internal storage unit and an external storage device of the computer device 1. The memory 12 may be used not only to store application software installed in the computer device 1 and various types of data, such as codes of an Internet of Things rule engine-based terminal control program, but also to temporarily store data that has been output or is to be output.

The processor 13 may in some embodiments be included of an integrated circuit, e.g. a single packaged integrated circuit, or a plurality of integrated circuits packaged with the same or different functions, including one or more Central Processing unit (CPU), microprocessors, digital processing chips, graphics processors, combinations of various control chips, etc. The processor 13 is a Control Unit of the computer device 1, connects various components of the entire computer device 1 using various interfaces and wires, runs or executes programs or modules stored in the memory 12 (e.g., executing an Internet of Things rule engine-based terminal control program, etc.), and calls data stored in the memory 12 to perform various functions of the computer device 1 and process data.

The processor 13 executes the operating system of the computer device 1 as well as applications installed. The processor 13 executes the application program to implement the steps in the above-described respective Internet of Things rule engine-based terminal control method embodiments, such as the steps shown in FIG. 1.

Illustratively, the computer program may be partitioned into one or more modules/units that are stored in the memory 12 and executed by the processor 13 to perform the present application. The one or more modules/units may be a series of computer readable instruction segments capable of performing specific functions for describing the execution of the computer program in the computer device 1. For example, the computer program may be divided into an acquisition unit 110, a parsing unit 111, an enhancement unit 112, a reading unit 113, a processing unit 114, a determination unit 115, a conversion unit 116 and a control unit 117.

The integrated units described above, implemented in the form of software functional modules, may be stored in a computer-readable storage medium. The above-mentioned software function module is stored in a storage medium, and includes a plurality of instructions to enable a computer device (which may be a personal computer, a computer device, a network device, etc.) or a processor to execute parts of the Internet of Things rule engine-based terminal control method according to various embodiments of the present application.

The integrated modules/units of the computer device 1, if implemented in the form of software functional units and sold or used as an independent product, may be stored in a computer-readable storage medium. On the basis of this understanding, the present application implements all or part of the processes of the above-described embodiments, and may also be implemented by instructing associated hardware devices through a computer program, which may be stored in a computer-readable storage medium, that when executed by a processor, performs the steps of the various method embodiments described above.

The computer program includes, among other things, computer program code in the form of source code, object code, executable files or some intermediate form. The computer readable medium may include: any entity or device, recording medium, U-disk, removable hard disk, magnetic disk, optical disk, computer memory, Read-Only Memory (ROM), random access memory, or the like, capable of carrying the computer program code.

Further, the computer-readable storage medium may mainly include a storage program area and a storage data area, where the storage program area may store an operating system, an application program required for at least one function, and the like; the storage data area may store data created according to the use of the blockchain node, etc.

The blockchain referred to in the present application is a new application mode of computer technology, such as distributed data storage, point-to-point transmission, consensus mechanism and encryption algorithm. A blockchain, essentially a decentralized database, is a string of data blocks generated in association using cryptographic methods, each data block containing information about a batch of network transactions for checking the validity of the information (anti-counterfeiting) and generating the next block. A blockchain may include a blockchain underlying platform, a platform product service layer, and an application service layer, etc.

The bus may be a Peripheral Component Interconnect (PCI) standard bus or an Extended Industry Standard Architecture (EISA) bus or the like. The bus may be divided into an address bus, a data bus, a control bus, etc. For case of illustration, only one straight line is shown in FIG. 3, but only one bus or one type of bus is not shown. The bus is arranged to enable connection communication between the memory 12 and at least one processor 13, etc.

Although not shown, the computer device 1 may further include a power supply, such as a battery, for powering the various components, preferably the power supply may be logically connected to the at least one processor 13 via power management apparatus, such that charging management, discharging management, and power consumption management functions are performed via the power management apparatus. The power supply may also include one or more of a DC or AC power source, a recharging device, a power failure detection circuit, a power converter or inverter, a power status indicator, and any other component. The computer device 1 may also include various sensors, Bluetooth modules, Wi-Fi modules, etc. which will not be described in more detail here.

Further, the computer device 1 may also include a network interface, which may alternatively include a wired interface and/or a wireless interface (such as a WI-FI interface, a Bluetooth interface, etc.), typically for establishing a communication connection between the computer device 1 and other computer devices.

Alternatively, the computer device 1 may further include a user interface, which may be a Display, an input unit, such as a Keyboard, alternatively a standard wired interface, a wireless interface. Alternatively, in some embodiments, the display may be a LED display, a liquid crystal display, a touch-sensitive liquid crystal display, an Organic Light-Emitting Diode (OLED) touchpad, or the like. The display may also suitably be called a display screen or a display configured to display information processed in the computer device 1 and to display a visualized user interface.

It should be appreciated that the examples are for illustrative purposes only and are not to be construed as limiting the scope of the patent application.

FIG. 3 only shows a computer device 1 with components 12-13, it can be appreciated by a person skilled in the art that the structure shown in FIG. 3 does not constitute a limitation of the computer device 1, and may include fewer or more components than shown, or combine certain components, or a different arrangement of components.

In conjunction with FIG. 1, the memory 12 in the computer device 1 stores a plurality of instructions to implement an Internet of Things rule engine-based terminal control method, and the processor 13 can execute the plurality of instructions to achieve acquiring data reported by a target terminal to an Internet of Things platform as terminal data when it is detected that the target terminal accesses an Internet of Things platform;

parsing, by using a pre-established thing model, the terminal data, so as to obtain parsed data, and storing the parsed data in a pulsar message queue;

consuming the parsed data in the pulsar message queue, and performing data enhancement on the parsed data, so as to obtain enhanced data;

reading, according to the terminal data, from a Redis cache a data processing rule and a terminal linkage rule corresponding to the target terminal;

processing the enhanced data by using a calcite framework and a data processing rule, so as to obtain target data, and storing the target data in the pulsar message queue;

consuming the target data in the pulsar message queue, determining a linkage terminal on the basis of the linkage rule, and determining an interface of the linkage terminal;

performing format conversion on the target data by means of an interface of the linkage terminal, so as to obtain converted data; and according to the terminal linkage rule and the converted data, controlling the linkage terminal to perform linkage.

In particular, the specific implementation of the above-mentioned instructions by the processor 13 can be described with reference to the relevant steps in the corresponding embodiment of FIG. 1, which will not be repeated here.

In the several embodiments provided herein, it should be appreciated that the disclosed systems, apparatuses, and methods may be implemented in other ways. For example, the apparatus embodiments described above are merely illustrative, e.g. the partitioning of the modules is merely a logical function partitioning, and additional partitioning may be practical to implement.

The present application is operational with numerous general purpose or special purpose computer system environments or configurations. For example: personal computers, server computers, hand-held or portable devices, tablet-type devices, multiprocessor systems, microprocessor-based systems, set-top boxes, programmable consumer electronics, network PCs, minicomputers, mainframe computers, distributed computing environments that include any of the above systems or devices, and the like. The present application may be described in the general context of computer-executable instructions, such as program modules, executed by a computer. Generally, the program modules include routines, programs, objects, components, data structures, etc. that perform particular tasks or implement particular abstract data types. The present application may also be practiced in distributed computing environments where tasks are performed by remote processing devices that are linked through a communications network. In a distributed computing environment, the program modules may be located in both local and remote computer storage media including storage devices.

The modules described as separate parts may or may not be physically separate, and parts displayed as modules may or may not be physical units, may be located in one position, or may be distributed on multiple network units. Some or all the modules may be selected according to actual needs to achieve the objective of the solution of this embodiment.

In addition, functional modules in the embodiments of the present application may be integrated into one processing unit, or each unit may exist alone physically, or two or more units are integrated into one unit. The above-mentioned integrated units can be realized in the form of hardware or in the form of hardware plus software functional modules.

It will be evident to a person skilled in the art that the present application is not limited to the details of the foregoing illustrative embodiments, and that the present application may be embodied in other specific forms without departing from the spirit or essential characteristics thereof.

The present embodiments are therefore to be considered in all respects as illustrative and not restrictive, the scope of the present application being indicated by the appended claims rather than by the foregoing description, and all changes which come within the meaning and range of equivalency of the claims are therefore intended to be embraced therein. Any reference signs in the claims shall not be construed as limiting the claim concerned.

Further, it will be appreciated that the word "include" does not exclude other elements or steps and the singular does not exclude the plural. Multiple units or apparatuses recited in the present application may also be implemented by one unit or apparatuses by software or hardware. The terms first, second, etc. are used to refer to names and do not denote any particular order.

Finally, it should be noted that the above embodiments are only intended to illustrate the technical solutions of the present application and not to limit the same, and although the present application is described in detail with reference to the preferred embodiments, it should be understood by a person skilled in the art that modifications or equivalent substitutions can be made to the technical solutions of the present application without departing from the spirit and scope of the technical solutions of the present application.

What is claimed is:

1. An Internet of Things rule engine-based terminal control method, comprising:

acquiring data reported by a target terminal to an Internet of Things platform as terminal data when it is detected that the target terminal accesses an Internet of Things platform;

parsing, by using a pre-established thing model, the terminal data, so as to obtain parsed data, and storing the parsed data in a pulsar message queue;

consuming the parsed data in the pulsar message queue, and performing data enhancement on the parsed data, so as to obtain enhanced data;

reading, according to the terminal data, from a Redis cache a data processing rule and a terminal linkage rule corresponding to the target terminal;

processing the enhanced data by using a calcite framework and a data processing rule, so as to obtain target data, and storing the target data in the pulsar message queue;

consuming the target data in the pulsar message queue, determining a linkage terminal on the basis of the linkage rule, and determining an interface of the linkage terminal;

performing format conversion on the target data by means of an interface of the linkage terminal, so as to obtain converted data; and according to the terminal linkage rule and the converted data, controlling the linkage terminal to perform linkage.

2. The Internet of Things rule engine-based terminal control method according to claim 1, further comprising:
performing real-time stream processing on the basis of a flink framework when executing the Internet of Things rule engine-based terminal control method.

3. The Internet of Things rule engine-based terminal control method according to claim 1, wherein the parsing, by using a pre-established thing model, the terminal data, so as to obtain parsed data, and storing the parsed data in a pulsar message queue comprises:
querying, using the terminal data, in the thing model, so as to obtain attribute fields;
combining the attribute fields, so as to obtain the parsed data;
acquiring a pre-established source data storage queue in the pulsar message queue; and
writing the parsed data to the source data storage queue.

4. The Internet of Things rule engine-based terminal control method according to claim 1, wherein the performing data enhancement on the parsed data, so as to obtain enhanced data comprises:
acquiring a device shadow;
combining the device shadow with the parsed data, so as to obtain the enhanced data; and
incrementally updating the enhanced data into the device shadow.

5. The Internet of Things rule engine-based terminal control method according to claim 1, before the reading, according to the terminal data, from a Redis cache a data processing rule and a terminal linkage rule corresponding to the target terminal, further comprising:
constructing a visual editing interface on the basis of a D3 framework;
collecting input data when it is detected that there is data input in the visual editing interface;
acquiring a terminal identifier of each terminal and a rule corresponding to each terminal from the collected data;
configuring a rule ID for each rule corresponding to each terminal respectively;
generating rule data of each terminal according to a terminal identifier of each terminal, a rule corresponding to each terminal and a configuration ID of each rule; and
storing the rule data in the Redis cache.

6. The Internet of Things rule engine-based terminal control method according to claim 1, wherein the processing the enhanced data by using a calcite framework and a data processing rule, so as to obtain target data, and storing the target data in the pulsar message queue comprises:
acquiring a statement identifier from the terminal data, and using the statement identifier to query a SQL statement in the terminal data;
checking legitimacy of the SQL statement using the calcite framework;
acquiring, using the SQL statement, table field information in the data processing rule when the legitimacy of the SQL statement passes the check;
creating a memory table according to the table field information;
writing the enhanced data into the memory table;
querying, using the SQL statement, configuration fields and condition data in the memory table;
filtering, according to the configuration field, the enhanced data, so as to obtain filtered data;
cleaning, according to the condition data, the screened data, so as to obtain the target data;
acquiring a pre-established target data storage queue in the pulsar message queue; and
writing the target data to the target data storage queue.

7. The Internet of Things rule engine-based terminal control method according to claim 1, wherein when according to the terminal linkage rule and the converted data, controlling the linkage terminal to perform linkage, the method further comprises:
reading, according to the terminal data, an alarm rule corresponding to the target terminal from the Redis cache when it is detected that alarm information is generated;
acquiring an alarm target and an alarm method recorded in the alarm rule;
sending the alarm information to the alarm target on the basis of the alarm method;
reading, according to the terminal data, a message flow rule corresponding to the target terminal from the Redis cache;
acquiring a cloud storage address or a northbound application address recorded in the message flow rule; and
uploading the target data to the cloud storage address or the northbound application address.

8. A computer device, comprising:
a memory for storing at least one instruction; and
a processor configured to execute instructions stored in the memory to implement the steps of:
acquiring data reported by a target terminal to an Internet of Things platform as terminal data when it is detected that the target terminal accesses an Internet of Things platform;
parsing, by using a pre-established thing model, the terminal data, so as to obtain parsed data, and storing the parsed data in a pulsar message queue;
consuming the parsed data in the pulsar message queue, and performing data enhancement on the parsed data, so as to obtain enhanced data;
reading, according to the terminal data, from a Redis cache a data processing rule and a terminal linkage rule corresponding to the target terminal;
processing the enhanced data by using a calcite framework and a data processing rule, so as to obtain target data, and storing the target data in the pulsar message queue;
consuming the target data in the pulsar message queue, determining a linkage terminal on the basis of the linkage rule, and determining an interface of the linkage terminal;
performing format conversion on the target data by means of an interface of the linkage terminal, so as to obtain converted data; and
according to the terminal linkage rule and the converted data, controlling the linkage terminal to perform linkage.

9. The computer device according to claim 8, further comprising:
performing real-time stream processing on the basis of a flink framework when executing the Internet of Things rule engine-based terminal control method.

10. The computer device according to claim 8, wherein the parsing, by using a pre-established thing model, the terminal data, so as to obtain parsed data, and storing the parsed data in a pulsar message queue comprises:
querying, using the terminal data, in the thing model, so as to obtain attribute fields;
combining the attribute fields, so as to obtain the parsed data;

acquiring a pre-established source data storage queue in the pulsar message queue; and writing the parsed data to the source data storage queue.

11. The computer device according to claim 8, wherein the performing data enhancement on the parsed data, so as to obtain enhanced data comprises:

acquiring a device shadow;

combining the device shadow with the parsed data, so as to obtain the enhanced data; and incrementally updating the enhanced data into the device shadow.

12. The computer device according to claim 8, before the reading, according to the terminal data, from a Redis cache a data processing rule and a terminal linkage rule corresponding to the target terminal, further comprising:

constructing a visual editing interface on the basis of a D3 framework;

collecting input data when it is detected that there is data input in the visual editing interface;

acquiring a terminal identifier of each terminal and a rule corresponding to each terminal from the collected data;

configuring a rule ID for each rule corresponding to each terminal respectively;

generating rule data of each terminal according to a terminal identifier of each terminal, a rule corresponding to each terminal and a configuration ID of each rule; and storing the rule data in the Redis cache.

13. The computer device according to claim 8, wherein the processing the enhanced data by using a calcite framework and a data processing rule, so as to obtain target data, and storing the target data in the pulsar message queue comprises:

acquiring a statement identifier from the terminal data, and using the statement identifier to query a SQL statement in the terminal data;

checking legitimacy of the SQL statement using the calcite framework;

acquiring, using the SQL statement, table field information in the data processing rule when the legitimacy of the SQL statement passes the check;

creating a memory table according to the table field information;

writing the enhanced data into the memory table;

querying, using the SQL statement, configuration fields and condition data in the memory table;

filtering, according to the configuration field, the enhanced data, so as to obtain filtered data;

cleaning, according to the condition data, the screened data, so as to obtain the target data;

acquiring a pre-established target data storage queue in the pulsar message queue; and writing the target data to the target data storage queue.

14. The computer device according to claim 8, wherein when according to the terminal linkage rule and the converted data, controlling the linkage terminal to perform linkage, further comprises:

reading, according to the terminal data, an alarm rule corresponding to the target terminal from the Redis cache when it is detected that alarm information is generated;

acquiring an alarm target and an alarm method recorded in the alarm rule;

sending the alarm information to the alarm target on the basis of the alarm method;

reading, according to the terminal data, a message flow rule corresponding to the target terminal from the Redis cache;

acquiring a cloud storage address or a northbound application address recorded in the message flow rule; and uploading the target data to the cloud storage address or the northbound application address.

15. A non-transitory computer-readable storage medium, wherein the computer-readable storage medium has stored therein at least one instruction which is executed by a processor in a computer device to implement the steps of:

acquiring data reported by a target terminal to an Internet of Things platform as terminal data when it is detected that the target terminal accesses an Internet of Things platform;

parsing, by using a pre-established thing model, the terminal data, so as to obtain parsed data, and storing the parsed data in a pulsar message queue;

consuming the parsed data in the pulsar message queue, and performing data enhancement on the parsed data, so as to obtain enhanced data;

reading, according to the terminal data, from a Redis cache a data processing rule and a terminal linkage rule corresponding to the target terminal;

processing the enhanced data by using a calcite framework and a data processing rule, so as to obtain target data, and storing the target data in the pulsar message queue;

consuming the target data in the pulsar message queue, determining a linkage terminal on the basis of the linkage rule, and determining an interface of the linkage terminal;

performing format conversion on the target data by means of an interface of the linkage terminal, so as to obtain converted data; and according to the terminal linkage rule and the converted data, controlling the linkage terminal to perform linkage.

16. The computer-readable storage medium according to claim 15, further comprising:

performing real-time stream processing on the basis of a flink framework when executing the Internet of Things rule engine-based terminal control method.

17. The computer-readable storage medium according to claim 15, wherein the parsing, by using a pre-established thing model, the terminal data, so as to obtain parsed data, and storing the parsed data in a pulsar message queue comprises:

querying, using the terminal data, in the thing model, so as to obtain attribute fields;

combining the attribute fields, so as to obtain the parsed data;

acquiring a pre-established source data storage queue in the pulsar message queue; and writing the parsed data to the source data storage queue.

18. The computer-readable storage medium according to claim 15, wherein the performing data enhancement on the parsed data, so as to obtain enhanced data comprises:

acquiring a device shadow;

combining the device shadow with the parsed data, so as to obtain the enhanced data; and incrementally updating the enhanced data into the device shadow.

19. The computer-readable storage medium according to claim 15, before the reading, according to the terminal data, from a Redis cache a data processing rule and a terminal linkage rule corresponding to the target terminal, further comprising:

constructing a visual editing interface on the basis of a D3 framework;

collecting input data when it is detected that there is data input in the visual editing interface;

acquiring a terminal identifier of each terminal and a rule corresponding to each terminal from the collected data;

configuring a rule ID for each rule corresponding to each terminal respectively;

generating rule data of each terminal according to a terminal identifier of each terminal, a rule corresponding to each terminal and a configuration ID of each rule; and storing the rule data in the Redis cache.

20. The computer-readable storage medium according to claim 15, wherein the processing the enhanced data by using a calcite framework and a data processing rule, so as to obtain target data, and storing the target data in the pulsar message queue comprises:

acquiring a statement identifier from the terminal data, and using the statement identifier to query a SQL statement in the terminal data;

checking legitimacy of the SQL statement using the calcite framework;

acquiring, using the SQL statement, table field information in the data processing rule when the legitimacy of the SQL statement passes the check;

creating a memory table according to the table field information;

writing the enhanced data into the memory table;

querying, using the SQL statement, configuration fields and condition data in the memory table;

filtering, according to the configuration field, the enhanced data, so as to obtain filtered data;

cleaning, according to the condition data, the screened data, so as to obtain the target data;

acquiring a pre-established target data storage queue in the pulsar message queue; and writing the target data to the target data storage queue.

\* \* \* \* \*